United States Patent [19]
Rinderer

[11] Patent Number: 5,209,619
[45] Date of Patent: May 11, 1993

[54] CHANNEL NUT FASTENER
[75] Inventor: Eric R. Rinderer, Highland, Ill.
[73] Assignee: B-Line Systems, Inc., Highland, Ill.
[21] Appl. No.: 895,628
[22] Filed: Jun. 9, 1992
[51] Int. Cl.[5] .................. F16B 21/00; F16B 27/00
[52] U.S. Cl. .................. 411/85; 411/553; 411/970
[58] Field of Search .................. 411/84, 85, 104, 109, 411/173, 177, 182, 187, 188, 161, 162, 549, 553, 970; 403/348

[56] References Cited

U.S. PATENT DOCUMENTS

| | | |
|---|---|---|
| Re. 22,673 | 9/1945 | Tinnerman . |
| 183,324 | 10/1976 | Pratt . |
| 292,513 | 1/1984 | Shailer . |
| 890,285 | 6/1908 | Krantz . |
| 950,771 | 3/1910 | Lohmann . |
| 1,655,104 | 1/1928 | Oakley . |
| 1,671,757 | 5/1928 | Allen . |
| 1,835,710 | 12/1931 | Jenkins et al. . |
| 2,144,350 | 1/1939 | Swanstrom . |
| 2,237,595 | 4/1941 | Dyer . |
| 2,249,923 | 7/1941 | Whitcombe . |
| 2,299,158 | 10/1942 | Luce . |
| 2,314,509 | 3/1943 | Olson . |
| 2,333,386 | 11/1943 | Murphy . |
| 2,341,829 | 2/1944 | Tinnerman . |
| 2,374,548 | 4/1945 | Leisure . |
| 2,381,233 | 8/1945 | Summers .................. 24/221 |
| 2,384,729 | 9/1945 | Darby . |
| 2,395,650 | 2/1946 | Allen . |
| 2,413,669 | 12/1946 | Whitcombe . |
| 2,421,201 | 5/1947 | Hallock . |
| 2,421,278 | 5/1947 | Luce . |
| 2,429,833 | 10/1947 | Luce . |
| 2,438,044 | 3/1948 | Freesz .................. 24/221 |
| 2,455,145 | 11/1948 | Swanstrom . |
| 2,469,311 | 5/1949 | Poupitch . |
| 2,477,429 | 7/1949 | Swanstrom et al. . |
| 2,531,348 | 11/1950 | Amesbury .................. 24/73 |
| 2,542,375 | 2/1951 | Torresen . |
| 2,575,594 | 11/1951 | Reiner . |
| 2,633,175 | 3/1953 | Desbrueres . |
| 2,737,268 | 3/1956 | Smith .................. 189/36 |
| 2,747,638 | 5/1956 | Cederquist . |
| 2,767,609 | 10/1956 | Cousino . |
| 2,767,951 | 10/1956 | Cousino .................. 248/245 |
| 2,780,264 | 2/1957 | Aspey . |
| 2,789,457 | 4/1957 | Allen . |
| 2,809,686 | 10/1957 | Shepherd . |
| 2,825,379 | 3/1958 | Becker . |
| 2,879,820 | 3/1959 | Trzcinski . |
| 2,903,035 | 9/1959 | Davenport et al. . |
| 2,920,672 | 1/1960 | Bronson . |
| 2,968,329 | 1/1961 | Reiner . |
| 3,004,638 | 1/1961 | Eaton .................. 189/36 |
| 3,005,292 | 10/1961 | Reiland .................. 50/71 |
| 3,036,673 | 5/1962 | Santerre .................. 189/36 |
| 3,037,731 | 6/1962 | Licklider et al. .................. 248/205 |
| 3,081,809 | 3/1963 | Rohe . |
| 3,114,404 | 12/1963 | Fiddler . |

(List continued on next page.)

OTHER PUBLICATIONS

Author-Power Status ©; Title-Channel Raceway & Framing Systems; p.-44; Date Jul. 1, 1985; and photograph showing double conveyor clamping nut.

Primary Examiner—Neill R. Wilson
Attorney, Agent, or Firm—Senniger, Powers, Leavitt & Roedel

[57] ABSTRACT

A fastener used to secure an object on a channel including a channel nut which may be entered into a slot in the channel and then turned about an axis of rotation to extend in a generally crosswise position relative to the slot for engagement of portions of the nut at locations generally adjacent opposite ends of the nut with edges of the channel. A retainer for the nut has a body and a flange integral with the body which may engage the channel at opposite sides of the channel slot for preventing the retainer from being pushed inwardly completely through the slot when the nut is turned to a crosswise position in the channel and when an object is being fastened to the channel. Resiliently deformable spring elements on the body of the retainer are so sized and arranged as to be engageable with the channel for holding the nut in its crosswise position against slippage lengthwise of the channel slot.

33 Claims, 5 Drawing Sheets

U.S. PATENT DOCUMENTS

| | | | |
|---|---|---|---|
| 3,186,049 | 6/1965 | Fiddler | 24/73 |
| 3,192,981 | 7/1965 | Oliver . | |
| 3,192,982 | 7/1965 | Rohe et al. . | |
| 3,205,927 | 9/1965 | Phelan . | |
| 3,259,164 | 7/1966 | Hernadi . | |
| 3,259,165 | 7/1966 | Tobian et al. . | |
| 3,259,166 | 7/1966 | Hernadi . | |
| 3,322,177 | 5/1967 | Phelan . | |
| 3,346,032 | 10/1967 | Gulistan . | |
| 3,429,601 | 2/1969 | Bremers | 287/198.36 |
| 3,432,197 | 3/1969 | Albertine et al. | 287/189.36 |
| 3,446,261 | 5/1969 | Dey . | |
| 3,449,883 | 6/1969 | Skubic et al. | 52/710 |
| 3,481,381 | 12/1969 | Black | 411/162 |
| 3,483,910 | 12/1969 | LaLonde et al. . | |
| 3,490,509 | 1/1970 | Otteson et al. . . | |
| 3,493,025 | 2/1970 | La Londe et al. | 411/85 X |
| 3,599,693 | 8/1971 | Bucheli . | |
| 3,669,171 | 6/1972 | Yavitch . | |
| 3,835,610 | 9/1974 | Harper et al. | 52/755 |
| 4,119,130 | 10/1978 | Berecz . | |
| 4,124,317 | 11/1978 | Dauth | 403/8 |
| 4,136,598 | 1/1979 | Hughes . | |
| 4,145,794 | 3/1979 | Schenk | 24/221 A |
| 4,146,074 | 3/1979 | Kowalski | 411/970 X |
| 4,239,139 | 12/1980 | Bott | 224/324 |
| 4,285,379 | 8/1981 | Kowalski | 411/85 |
| 4,348,140 | 9/1982 | Bergholz et al. | 411/103 |
| 4,385,454 | 5/1983 | Withers et al. | 34/110 |
| 4,391,546 | 7/1983 | Lyon | 403/189 |
| 4,392,677 | 7/1983 | Hardouin | 285/137 R |
| 4,405,285 | 9/1983 | Surdi | 416/220 R |
| 4,410,298 | 10/1983 | Kowalski | 411/112 |
| 4,460,299 | 7/1984 | Kowalski | 411/85 |
| 4,486,133 | 12/1984 | Pletcher | 411/84 |
| 4,498,271 | 2/1985 | Köinger et al. | 52/707 |
| 4,506,747 | 3/1985 | Wykhuis | 180/62 |
| 4,529,244 | 7/1985 | Zaydel | 296/191 |
| 4,645,393 | 2/1987 | Pletcher | 411/84 |
| 4,708,554 | 11/1987 | Howard | 411/84 |
| 4,758,124 | 7/1988 | Ingeberg | 411/85 |
| 4,768,907 | 9/1988 | Gauron | 411/85 |
| 4,784,554 | 11/1988 | Break | 411/383 |
| 4,789,286 | 12/1988 | Laput | 411/84 |
| 4,790,701 | 12/1988 | Baubles | 411/85 |
| 4,793,757 | 12/1988 | Peterson | 411/533 |
| 4,828,440 | 5/1989 | Anderson et al. | 411/85 |
| 4,830,531 | 5/1989 | Condit et al. | 403/348 |
| 4,840,525 | 6/1989 | Regentisch | 411/85 |
| 4,861,182 | 8/1989 | Gillet | 403/264 |
| 4,861,207 | 8/1989 | Do | 411/104 |
| 4,886,407 | 12/1989 | Harbin | 411/104 |
| 4,907,923 | 3/1990 | McGrath, Jr. | 411/107 |
| 4,911,349 | 3/1990 | Miller | 224/326 |
| 4,917,553 | 4/1990 | Muller | 411/85 |
| 4,934,886 | 6/1990 | Aikens | 411/85 |
| 4,948,313 | 8/1990 | Zankovich | 411/85 |
| 4,950,099 | 8/1990 | Roellin | 403/348 |
| 4,964,490 | 10/1990 | Watanabe | 188/73.44 |
| 4,977,836 | 12/1990 | Bond | 108/55.1 |
| 4,981,405 | 1/1991 | Kato | 411/553 X |
| 4,984,926 | 1/1991 | Harley | 403/8 |
| 4,998,701 | 3/1991 | Rawald | 248/224.3 |
| 5,022,804 | 6/1991 | Peterson | 411/104 |
| 5,029,936 | 7/1991 | Gonzalez | 296/210 |
| 5,032,047 | 7/1991 | Theakston | 411/104 |
| 5,037,258 | 8/1991 | Heurteux | 411/104 |
| 5,054,978 | 10/1991 | Kowalski | 411/85 |
| 5,067,863 | 11/1991 | Kowalski | 411/85 |

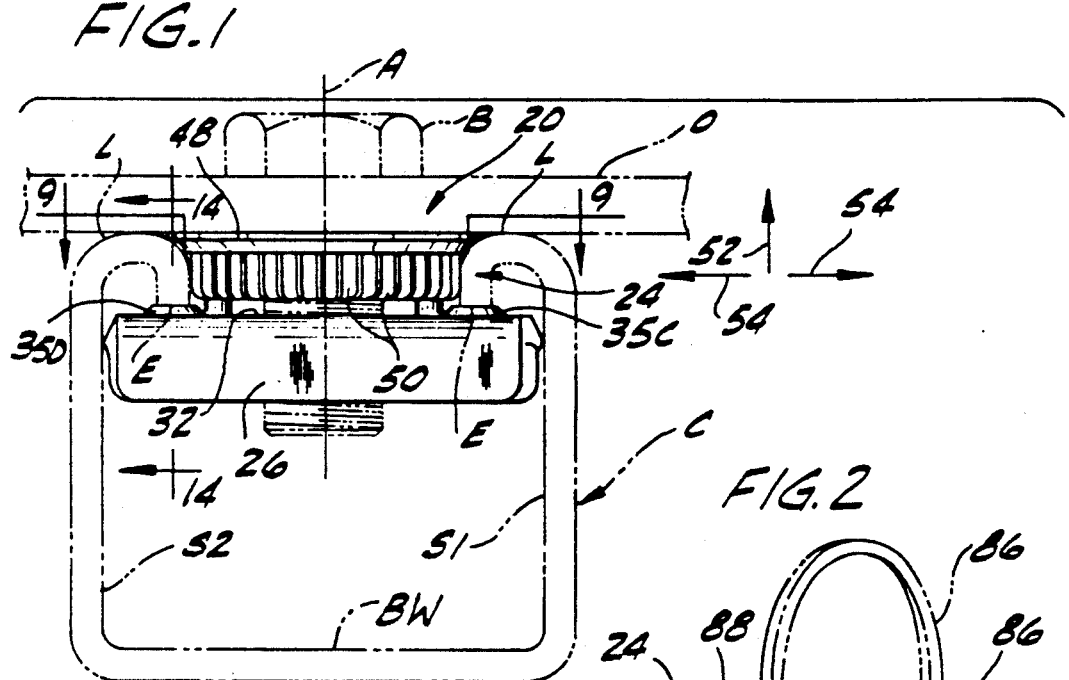
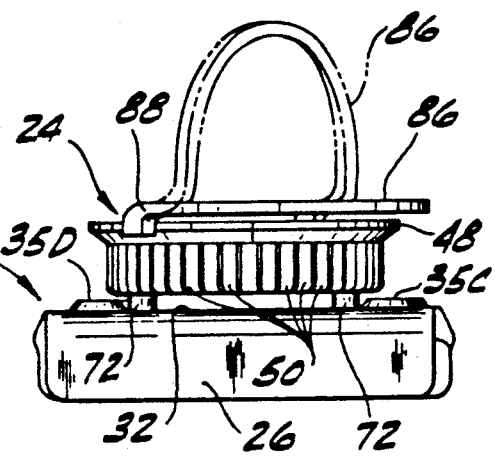
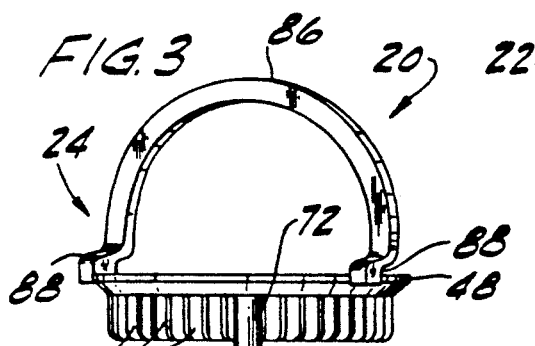
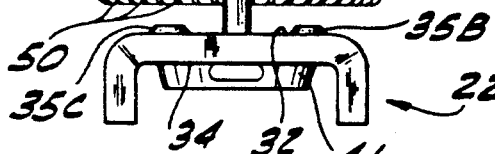
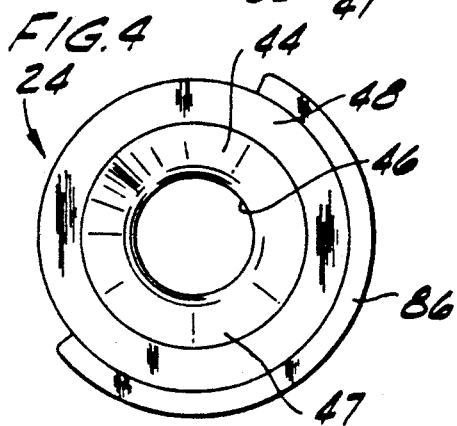
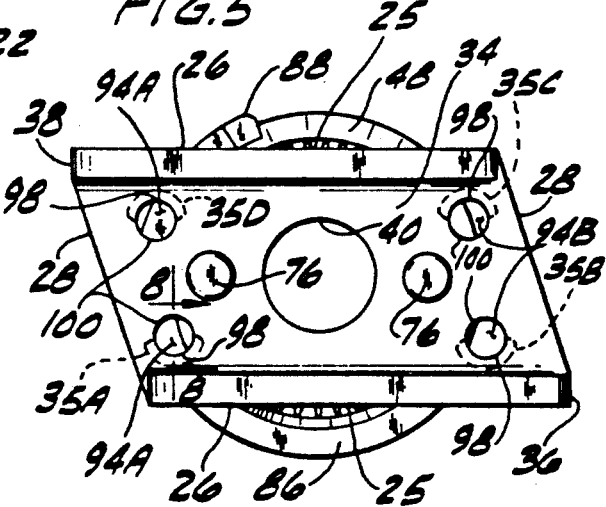

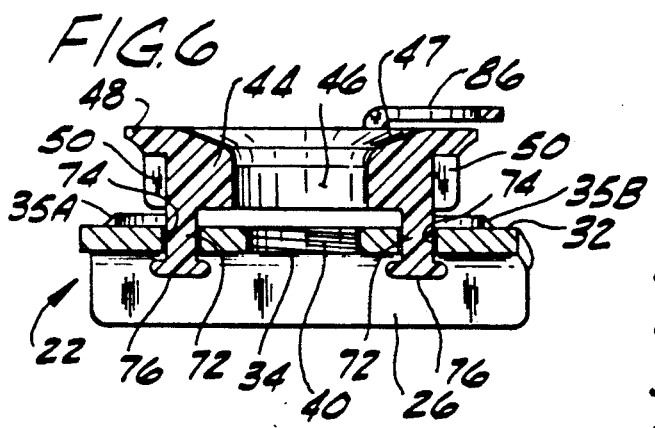
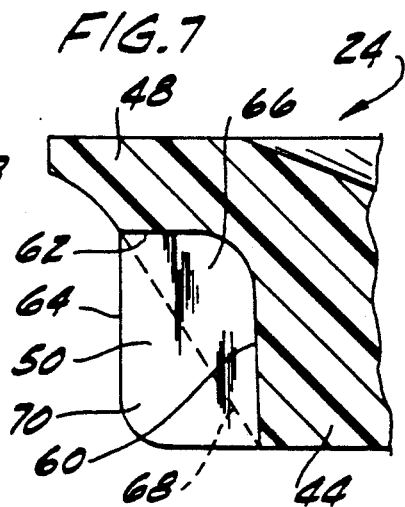
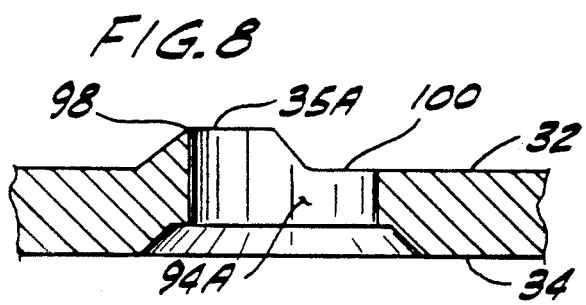
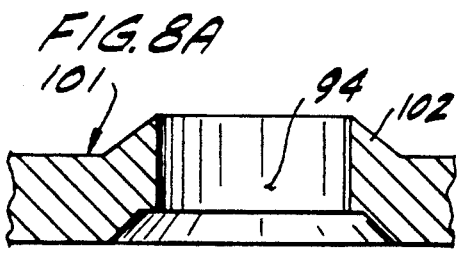
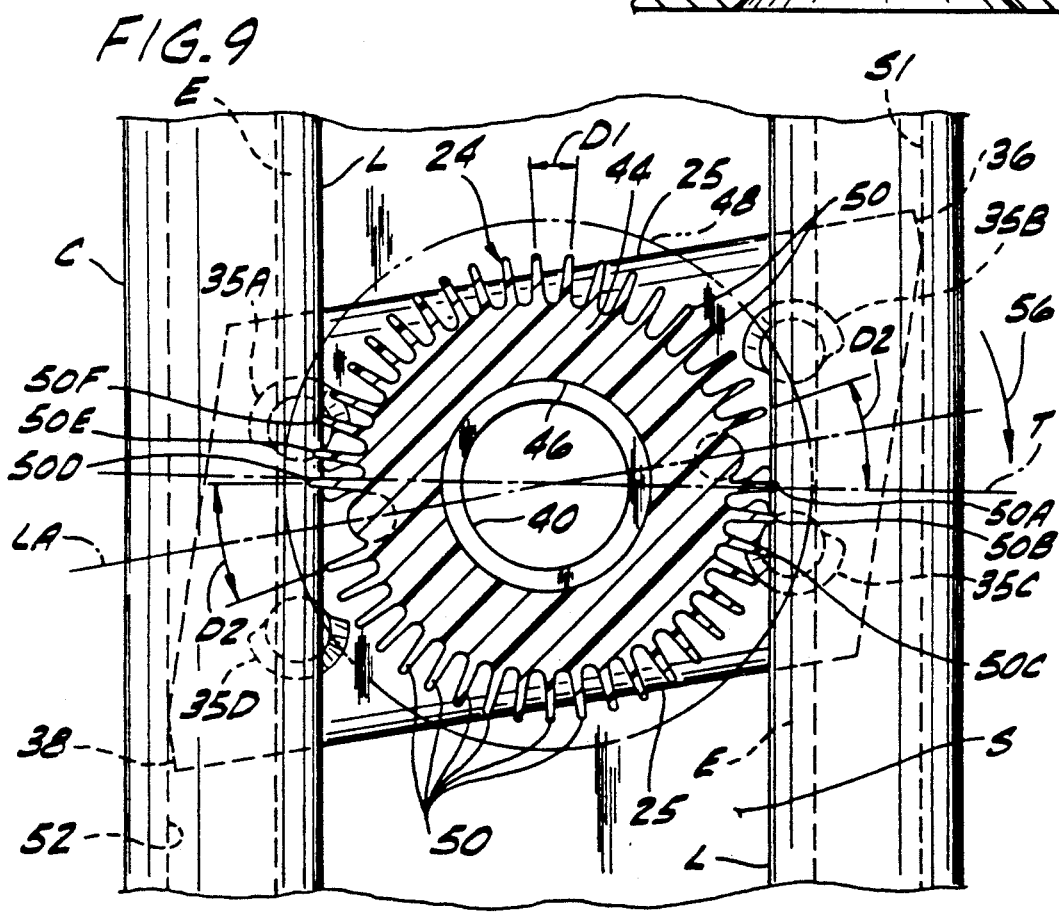

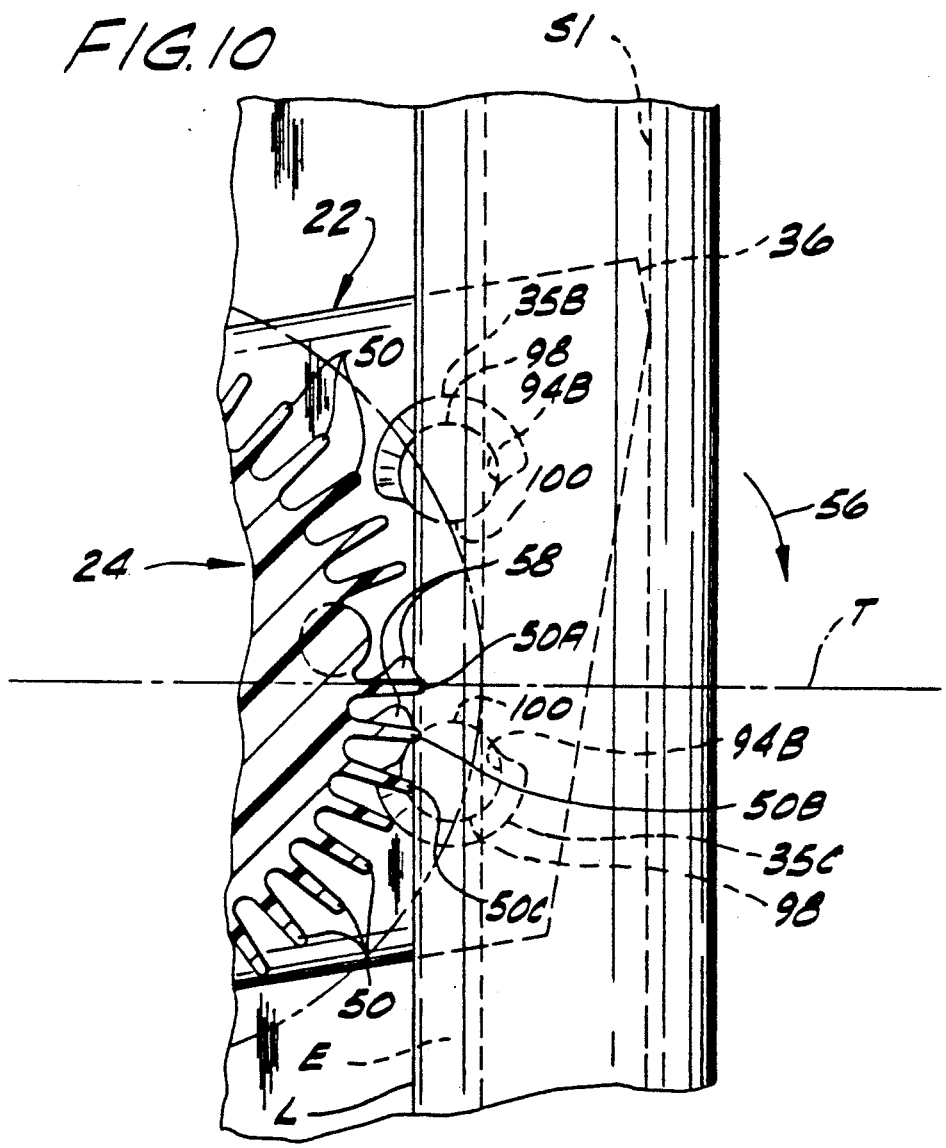

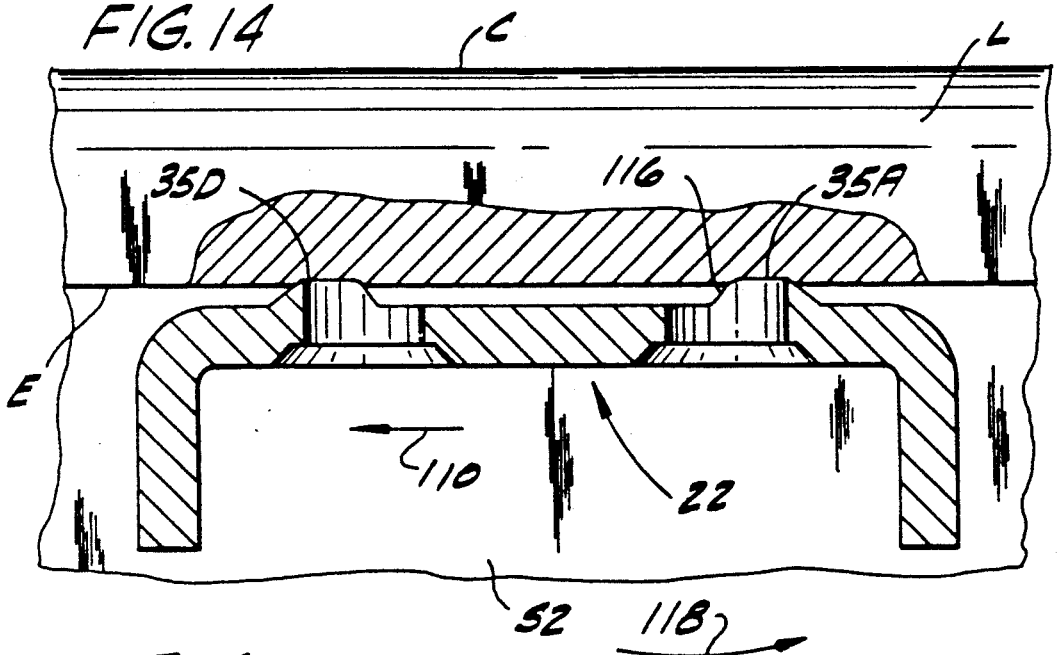
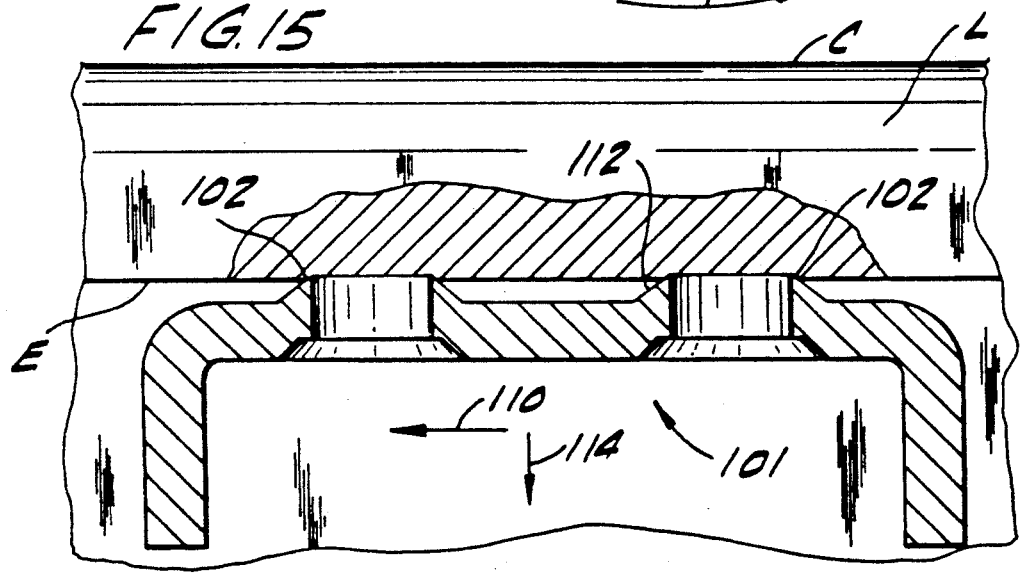
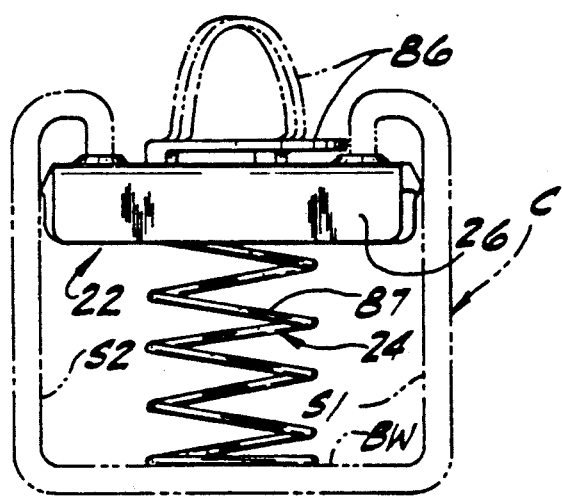

CHANNEL NUT FASTENER

SUMMARY OF THE INVENTION

This invention relates generally to fasteners for the construction industry, and more particularly to what may be referred to as channel nuts used for securing objects to metal channel framing of the type commonly used in construction.

Metal channel framing is commonly used to support mechanical and electrical fixtures in buildings. The framing is formed as a channel to have a bottom wall and generally parallel opposite side walls extending from the bottom wall, the outer edge margins of each side wall being bent to form inwardly directed generally hook-shaped lips which define a slot therebetween extending the length of the channel. An elongated nut is typically used to fasten an object to the channel, with the nut having a width less than the width of the channel slot and a length greater than the width of the channel slot so that the nut may be aligned with the slot, entered into the slot and passed inwardly through the slot from the outside to the inside of the channel and then turned to extend in a generally crosswise position relative to the slot for engagement of portions of the outside face of the nut at locations generally adjacent opposite ends of the nut with said channel edges. A retainer on the nut usually holds the nut in engagement with the channel lips so that the nut does not slip relative to the channel during fastening of an object to the channel, which is accomplished by means of a bolt threaded through a hole in the nut. Examples of this type of channel nut are illustrated in co-assigned U.S. Pat. Nos. 4,146,074, 4,410,298, 5,054,978 and 5,067,863.

While the retainers described in the above patents are generally satisfactory, they are relatively expensive to manufacture. Assembly of the retainers with their respective nuts is a labor-intensive operation. Moreover, installation of the nuts and retainers in the channel requires a tool (e.g., a screwdriver). There is need, therefore, for a retainer which is more economical to make and to assemble with a nut, and a need for a retainer and nut which can be installed in a channel without using a tool.

Among the several objects of this invention may be noted the provision of an improved retainer for use with a channel nut of the type described above; the provision of such a retainer which is economical to manufacture and lends itself to automated assembly with a nut; the provision of such a retainer having a handle feature which facilitates turning of the nut to its crosswise position in a channel and which reduces the risk of dropping the nut during installation; the provision of such a retainer which holds the nut against slippage relative to the channel after installation of the nut in the channel; the provision of such a retainer which is sufficiently rigid so that it cannot easily be pushed completely through the channel slot during installation of the channel nut; and the provision of such a retainer which is lightweight.

A fastener of the present invention is used to secure an object on a channel having a bottom and a pair of side walls with inwardly directed lips formed thereon defining a slot therebetween extending the length of the channel. The lips terminate in edges extending lengthwise of the slot at opposite sides of the slot. In general, the fastener comprises a nut having a first face constituting an outside face, an opposite face constituting an inside face, and opposite ends. The width of the nut is less than the width of the channel slot and its length greater than the width of the channel slot so that the nut may be aligned with the slot, entered into the slot and passed inwardly through the slot from the outside to the inside of the channel and then turned about an axis of rotation to extend in a generally crosswise position relative to the slot for engagement of portions of the outside face of the nut at locations generally adjacent opposite ends of the nut with the channel edges. The nut also has a hole in it for receiving another fastener for fastening the object to the channel when the nut is in its crosswise position. A retainer on the outside face of the nut retains the nut in its crosswise position prior to and during fastening of the object to the channel. The retainer has a body with an opening therethrough generally coaxial with the hole through the nut to enable insertion of a fastener through the opening and into and through the hole in the nut. Flange means integrally formed as one piece with the body extends laterally from the body for engagement with the channel lips at opposite sides of the channel slot when the nut is passed through the slot and turned to its crosswise position, the flange means being substantially inflexible for preventing the retainer from being pushed inwardly completely through the slot when the nut is turned to its crosswise position and when an object is being fastened to the channel. Resiliently deformable spring elements on the body of the retainer between said flange means and the outside face of the nut are integrally connected to the body at closely spaced intervals circumferentially of the body. The spring elements are so sized and dimensioned as to be engageable with the channel lips when the nut is turned to its crosswise position for exerting a spring force against the channel lips tending to hold the nut in its crosswise position against slippage lengthwise of the channel slot. Means is provided for holding the retainer in assembly with the nut.

Other objects and features of the present invention will be in part apparent and in part pointed out hereinafter.

BRIEF DESCRIPTION OF THE DRAWINGS

FIG. 1 is an elevation of a fastener mounting an object on a channel;

FIG. 2 is a side elevation of a nut and a retainer having a handle with the operable position of the handle shown in phantom;

FIG. 3 is an end elevation of the nut and retainer of FIG. 2.

FIG. 4 is a top plan of the retainer;

FIG. 5 is a bottom plan of the nut and retainer;

FIG. 6 is a longitudinal section of the nut and retainer;

FIG. 7 is an enlarged fragmentary section of the retainer of FIG. 6, showing a fin-like member of the retainer;

FIG. 8 is an enlarged fragmentary section taken in the plane including line 8—8 of FIG. 5 showing a tooth of a preferred design on the nut;

FIG. 8A is an enlarged fragmentary section similar to FIG. 8 but showing a tooth of a lesser preferred design;

FIG. 9 is a section taken in the plane including line 9—9 of FIG. 1;

FIG. 10 is an enlarged fragmentary view of the right side of FIG. 9;

FIG. 14 is an enlarged fragmentary section taken in the plane including line 14—14 of FIG. 1 with the retainer, bolt and object removed for clarity;

FIG. 15 is the section of FIG. 14, but showing a nut of a lesser preferred embodiment; and FIG. 16 is an elevation of a third embodiment of the fastener.

Corresponding reference characters indicate corresponding parts throughout the several views of the drawings.

DETAILED DESCRIPTION OF THE PREFERRED EMBODIMENTS

Figure 11:
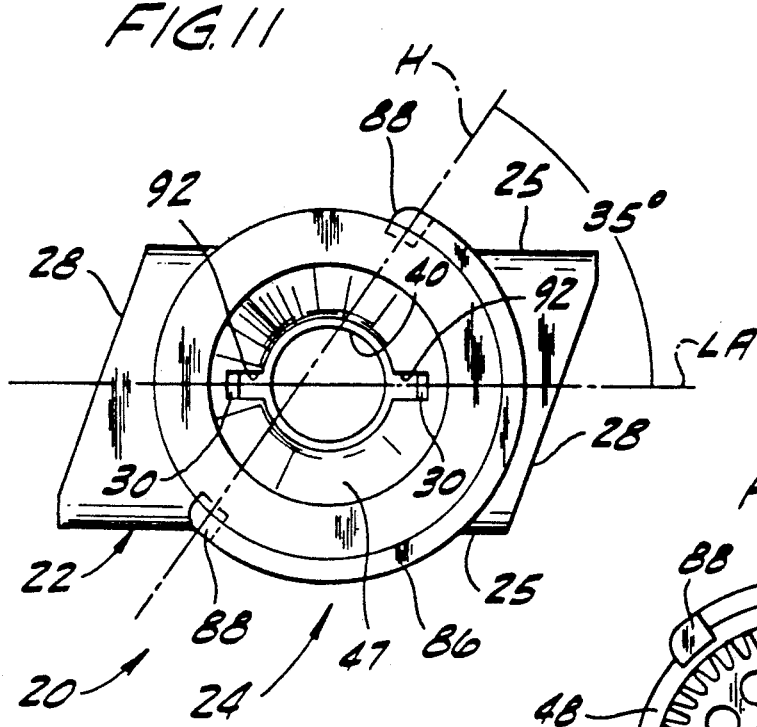
FIG. 11 is top plan of a retainer of a second embodiment.

Referring now to the drawings, a fastener of the present invention, generally indicated at 20, is shown to comprise a nut 22 and a generally annular retainer 24 secured to the nut for use in securing an object 0 to a channel C. As shown in FIGS. 1 and 9, the channel C has a bottom wall BW and a pair of side walls S1, S2 with inwardly directed lips L defining a slot S therebetween extending the length of the channel. The lips L are generally hook-shaped in cross section and terminate in edges E extending lengthwise of the slot S at opposite sides of the slot. The nut 22 is generally channel-shaped, having opposite sides 25, flanges 26 extending lengthwise of the nut between opposing ends 28, a first face constituting an outside face 32, and an opposite face constituting an inside face 34.

The width of the nut 22 is less than the width of the channel slot, but its length is greater than the width of the channel slot S so that the nut may be aligned with the slot, entered into the slot S and passed inwardly through the slot from the outside to the inside of the channel C. Once inserted into the channel C, the nut 22 may be turned about an axis of rotation A perpendicular to the outside and inside faces 32, 34 of the nut to extend in a generally crosswise position relative to the slot S for engagement of portions of the outside face of the nut at locations generally adjacent the opposite ends 28 of the nut with the channel edges E. The engagement of teeth, designated 35A, 35B, 35C and 35D, respectively, on the nut 22 with the edges E of the lips L hold the nut from slipping lengthwise of the channel C and will be more particularly described hereinafter. As shown in FIG. 11, the channel nut 22 is rhomboidal in shape, the opposing ends 28 of the nut being generally slanted relative to a longitudinal axis LA of the nut extending lengthwise of the nut midway between opposite sides 25 of the nut. However, at the lower righthand corner 36 and the upper lefthand corner 38 of the nut 22 (as seen in FIG. 11) the ends lie in planes generally perpendicular to the central longitudinal axis LA of the nut. As shown in FIG. 9, the corners 36, 38 of the nut engage respective side walls S1, S2 of the channel C when the nut is in its crosswise position. A suitable fastener, such as bolt B, is threadably received through a central threaded hole 40 in the nut 22 for fastening the object 0 to the channel C when the nut is in the crosswise position. The hole 40 is formed by punching through the nut 22 from the outside face 32 to the inside face 34, which leaves a generally annular upset formation of metal 41 projecting inwardly from the inside face of the nut (FIG. 3).

The retainer 24, which is secured to the nut 22 on the outside face 32 thereof, has a body 44 with an opening 46 therethrough generally coaxial with the hole 40 in the nut to enable insertion of the bolt B through the opening 46 and into and through the hole in the nut. The retainer 24 retains the nut 22 in its crosswise position in the channel C and prevents slippage of the nut longitudinally of the channel in the slot S prior to and during fastening of the object 0 with the bolt B. The prevention of slippage is particularly important when, as often is the case, the channel C extends generally vertically. However, regardless of the orientation of the channel C, the retainer 24 prevents slippage or rotation of the nut 22 away from its crosswise position when the bolt B is being tightened, when the channel is bumped, such as when the object O is being positioned for fastening onto the channel, or when the fastener 20 is jarred, such as when the workman probes for the opening 46 in the retainer with the bolt after the object is positioned in the channel. To facilitate insertion of the bolt B into the opening 46 in the retainer, an outside face 47 of the body 44 surrounding the opening 46 is generally concave in shape so that the end of the bolt is guided toward the opening upon engagement with the outside face 47.

The retainer 24 is molded inexpensively from suitable plastic (e.g., polypropellene), and includes an annular flange 48 formed integrally as one piece with the body 44. The flange 48 extends laterally from the body 44 around its circumference and is dimensioned for engagement with the channel lips L at opposite sides of the channel slot S when the nut 22 is passed through the slot and turned to its crosswise position. The flange 48 is substantially inflexible for preventing the retainer 24 from being pushed inwardly completely through the slot S when the nut 22 is turned to its crosswise position and when the object O is being fastened to the channel C.

A plurality of resiliently deformable fin-like members 50 (broadly "spring elements") are integrally connected to the body 44 and flange of the retainer 24 at closely spaced intervals circumferentially around the body. As shown in FIG. 9, the fin-like members 50 are so sized and dimensioned as to be engageable with the lips L when the nut 22 is turned to its crosswise position for exerting a spring force against the lips L tending to hold the nut in its crosswise position against slippage lengthwise of the channel slot S. More specifically, the spring force exerted by the fin-like members 50 on the lips L has a first component 52 generally perpendicular to a plane containing the edges E of the lips at opposite sides of the slot S (FIG. 1). The first component 52 of force tends to draw the nut 22 outwardly with respect to the slot S into clamping engagement with the edges E of the lips L, thereby inhibiting slippage of the nut lengthwise of the slot. A second component 54 of the spring force exerted by the fin-like members 50 is directed generally parallel to the plane containing the edges E of the channel lips L (i.e., generally outwardly against the lips on both sides of the slot), so that the fin-like members are adapted for anti-slip frictional engagement with the lips thereby to inhibit slippage of the nut 22 lengthwise of the slot S.

In addition to the first and second components 52, 54 of the spring force, the fin-like members 50 are also arranged so that when the nut 22 is turned on the axis of rotation A to its crosswise position, the spring force also includes a third component 56 (FIG. 9) tending to hold the nut against rotation in the opposite direction out of its crosswise position. Rotation of the nut 22 away from the crosswise position can cause the teeth 35A-35D to disengage from the edges E of the channel. The amount of load which can be supported by the nut 22 before slipping longitudinally in the slot S is reduced markedly when the teeth 35A-35D are not engaged with the edges E.

As shown in FIG. 9, the fin-like members 50 are spaced apart a first distance D1 around the circumference of the body 44 except at two locations diametrically opposite one another where adjacent fin-like members are spaced apart a second distance D2 greater than the first distance D1. The locations where the fin-like elements 50 are spaced apart the larger distance D2 are positioned so that when the nut 22 is rotated (in a clockwise direction as shown in FIG. 9) to its crosswise position, no fin-like members on the right side of the slot S above a line T extending transversely of the channel C through the center of opening 46 are engaging the lip L. However, the fin-like members 50A, 50B and 50C engage the lip L on or below the transverse line T. Conversely, on the left side of the slot S no fin-like members 50 engage the lip L below the transverse line T, but fin-like members 50D, 50E and 50F engage the lip on or above the transverse line. It will be understood that this specific design may vary so long as there is a net spring force tending to hold the nut in its crosswise position as discussed in more detail below.

Referring to FIG. 10, the fin-like members 50A, 50B, 50C engage the lip L and are deformed. The lower portions 58 of the engaged fin-like members 50B, 50C are deflected in a counter-clockwise direction out of the plane of the fin-like members and exert a spring force which is directed generally outwardly against the channel lips. The spring force of the fin-like members 50B, 50C below the transverse line T produces a torque which contributes to the third component 56 of the spring force tending to rotate the retainer 24 and nut 22 in the clockwise direction. The fin-like member 50A substantially on the transverse line contributes nothing to the third component 56 of the spring force. The reverse is true on the left side of the slot S, where the fin-like members 50E, 50F engaged with the lip above the transverse line T contribute a torque in the clockwise direction adding to the third component 56 of the spring force.

The numbers of fin-like members 50 engaging the channel lips L on each side of the slot S is the same above and below the transverse line T when the nut 22 is not in its crosswise position. Any fin-like members 50 engaging the lips L above the transverse line T on the right side and below the transverse line on the left side tend to rotate the nut in a counterclockwise direction. Thus, there is no net rotational force component exerted by the fin-like members 50 away from the crosswise position of the nut. However, because of the unequal numbers of fin-like members 50 in engagement with the lip L above and below the transverse line T on both sides of the slot S when the nut 22 is in and near its crosswise position, the net rotational force component (i.e., the third component 56 of the spring force) is in the clockwise direction. The nut 22 is held against rotation in the clockwise direction beyond its crosswise position because of the engagement of its corners 36, 38 with respective side walls S1, S2 of the channel, and the third component 56 of the spring force exerted by the engaged fin-like members 50B, 50C, 50E and 50F in the crosswise position resists rotation in the counterclockwise direction.

The fin-like members 50 are thin (approximately 0.015 inches in the illustrated embodiments), planar and generally rectangular in shape. The spacing D1 of the fin-like members 50 around the circumference of the body 44 is approximately 8°, except at the two locations discussed above, where adjacent fin-like members are spaced apart the greater distance D2, which is approximately 20°. Referring now to FIG. 7, each fin-like member 50 is connected to the body 44 along a first edge 60 extending generally axially with respect to the annular retainer body 44, to the flange 48 along a second edge 62 extending generally radially with respect to the body, and has at least one free edge 64 adapted for engagement with the channel lips L. A first portion 66 of the fin-like member 50 lies on one side of a line 68 extending diagonally with respect to the fin-like member and generally bisecting the rectangle, and a second portion 70, bounded at least in part by the free edge 64, lies on the opposite side of the line. Upon insertion of the nut 22 into the channel slot S and turning the nut to its crosswise position, the free edge 64 engages the lip L, and the free edge and second portion 70 are resiliently deflected out of the plane of the first portion 66. There is also some radially inward compression of the second portion 70 of each fin-like member 50. The compression is generally in the plane of first portion 66, and occurs primarily near the first edge 60 of the fin-like member 50 which is connected to the flange 48. The first portion 66 of the fin-like member 50 remains substantially undeformed even after engagement of the fin-like member with the lips L.

As shown in FIG. 6, a pair of pins 72 formed integrally with the body 44 project through apertures 74 in the nut 22. In the first embodiment, the cylindrical pins 72 are of uniform diameter along their entire length, the diameter being somewhat less than that of the apertures 74 in the nut. After insertion through the apertures 74, the distal ends 76 of the pins are enlarged to diameter greater than that of the apertures by heating and flattening the ends against the inside face 34 of the nut to hold the retainer 24 in assembly with the nut 22.

Figure 12:
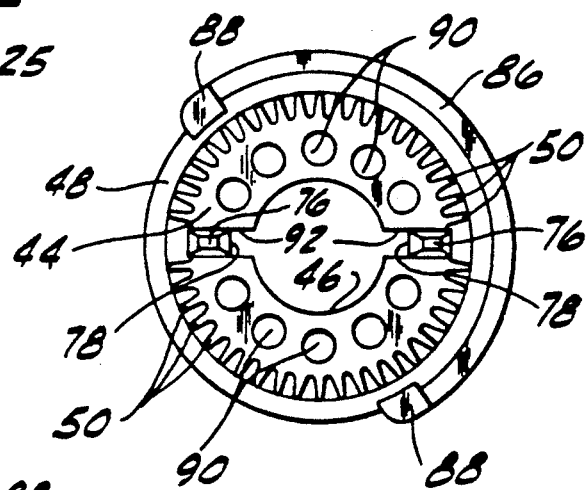
FIG. 12 is a bottom plan of the retainer of FIG. 11.
Figure 13:
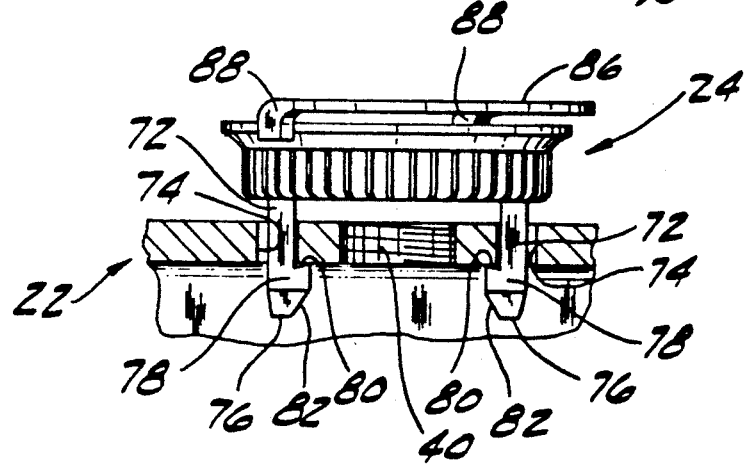
FIG. 13 is a fragmentary longitudinal section of a channel nut assembled with the retainer of FIG. 11.

In a second embodiment of the invention, shown in FIGS. 11-13, the pins 72 are adapted for snap-lock connection to the nut 22. The pins 72 are generally rectangular in cross section with laterally outwardly projecting feet or tabs 78 at their distal ends 76. The tabs 78 each have a generally flat surface 80 projecting laterally inwardly from the pin 72, and an inclined surface 82 which slopes inwardly toward the distal end 76 of the pin. The pins 72 are smaller in their transverse dimension than the transverse dimension of the apertures 74 except at the tabs 78. To assemble the retainer 24 of the second embodiment with the nut 22, the retainer is moved toward the outside face 32 of the nut with the pins 72 aligned with respective apertures 74 in the nut. Upon entry into an aperture 74, the inclined surface 82 of each tab 78 engages the nut 22 at the perimeter of the aperture. Further movement into the aperture 74 causes the tab 78 to be deflected resiliently inwardly, with the inclined surface 82 acting as a wedge to facilitate such deflection. The tab 78 snaps outwardly to its original undeflected configuration when it clears the aperture so that the flat surface 80 faces the inside face 34 of the nut. Engagement of the flat surfaces 80 of the tabs 78 with the inside face 34 of the nut prevents withdrawal of the pins 72 from the apertures 74.

Assembly of the nut 22 and retainer 24 is readily automated for both the first and second embodiments of the retainer.

To install a fastener 20 of this invention on a channel C, a workman aligns the nut 22 with the channel slot S and inserts the nut into the slot. Insertion of the fastener 20 into the channel C is limited by engagement of the flange 48 of the retainer 24 with the lips L. The workman then uses the retainer 24 to turn the nut 22 to its crosswise position (the position shown in FIG. 9). A generally semi-annular bail member or handle 86 attached at its ends 88 to the flange 48 of the retainer can be gripped by the workman to aid in the insertion and turning of the nut 22. As shown in solid lines in FIG. 2, the handle initially lies in a plane generally parallel to a plane including the flange 48. However, the handle 86 is resiliently flexible and, as illustrated in phantom lines in FIG. 2, it may be pulled away from the retainer 24 to an operable position in which the handle arches over the body 44 of the retainer. In this position the workman may easily grasp the fastener 20.

In a third embodiment of the fastener 20 shown in FIG. 16, the handle 86 is attached to (or formed as one piece with) the nut 22. The nut 22 may be made of a suitable plastic, rather than sheet metal. The retainer 24 is a coil spring 87 mounted on the inside face 34 of the nut. The spring 87 is adapted to engage the bottom wall BW of the channel upon insertion in the slot. Compression of the spring biases the nut 22 against the channel edges E to hold the nut from slipping in the channel.

In the preferred embodiments, the handle 86 is attached to the retainer 24 (or nut 22) so that turning the nut to its crosswise position can be accomplished with a comfortable twisting motion of the wrist. As shown in FIG. 11, the ends 88 of the handle lie on a line H, which is oblique to the longitudinal axis LA of the nut. In the illustrated embodiments, the angle between the line H and the longitudinal axis LA of the nut 22 is approximately 35°. To align the nut 22 for insertion into the slot S, the workman gripping the fastener 20 by the obliquely oriented handle 86 must twist his wrist slightly from its normally relaxed position in the counterclockwise direction. The nut 22 is turned clockwise to its crosswise position by twisting the wrist in that direction through the rest position and somewhat (e.g., approximately 55°) beyond it. It may be seen that the orientation of the handle 86 requires the wrist to be twisted clockwise from the rest position substantially less than the approximately 90° turn of the nut 22 to its crosswise position. The reduction in clockwise twisting of the wrist beyond its rest position is achieved by attaching the handle 86 to the retainer 24 so that its orientation relative to the nut 22 is such that the wrist is twisted a small amount in the counterclockwise direction prior to turning the nut to its crosswise position.

In the first and second embodiments, the body 44 of the retainer 24, the flange 48, the fin-like members 50 and the handle are integrally molded as a single plastic part. This allows the retainers 24 to be produced rapidly and at a low cost. In the third embodiment (FIG. 16), the nut 22 and handle 87 are preferably formed as one piece. To further reduce material cost, the mold (not shown) is provided with pins which leave holes 90 in the underside of the body 44 (FIG. 12). The holes 90 reduce the amount of material needed to produce the retainer 24 without significantly affecting the strength of the retainer. In the second embodiment, the central opening 46 in the body 44 has diametrically opposed channels 92 extending radially outward from its perimeter over the tabs 78 of the legs. The channels 92 allow forming members (not shown) to extend through the opening 46 and form the flat surface 80 of the tabs 78.

Anti-slip means, including in this embodiment the four teeth 35A-35D and two pairs of openings (designated 94A and 94B, respectively), inhibits slippage of the nut 22 lengthwise of the channel C in the slot S when a load is applied to the nut tending to cause such slippage. The openings 94A, 94B extend through the nut 22 from the inside face 34 to the outside face 32. The teeth 35A-35D are integral with the nut and project outwardly from the outside face 32 of the nut at the peripheries of respective openings 94A, 94B. Each of the openings 94A, 94B has a first peripheral portion, constituting a laterally outer portion 98, generally closer to a respective side 25 of the nut than to its longitudinal axis LA, and a second peripheral portion, constituting a laterally inner portion 100, generally closer to the longitudinal axis than to a respective side of the nut. The teeth 35A-35D extend only along the laterally outer portions 98 of respective openings 94A, 94B with the laterally inner portions 100 being substantially free of any teeth. When the nut 22 is in its crosswise position as shown in FIG. 9, a first pair of the teeth (35A, 35D) adjacent the left end of the nut on opposite sides of the longitudinal axis LA of the nut engage the edge E of the lip L on the left side of the channel. A second pair of the teeth (35B, 35C) adjacent the right end of the nut on opposite sides of the longitudinal axis LA engage the edge E of the lip L on the right side of the channel. The first component 52 of spring force exerted by the fin-like members 50 of the retainer 24 and directed outwardly of the slot S pulls the teeth 35A-35D into engagement with the edges E of the lips so that they inhibit slippage of the nut lengthwise of the slot after the nut has been inserted into the channel C, but prior to bolting the object O onto the channel. The openings 94A, 94B and teeth 35A-35D are preferably formed by punching, but may be formed using other methods and still fall within the scope of the present invention.

The teeth 35A-35D are constructed for preventing the nut 22 from slipping when forces applied to the bolt tend to tilt the nut generally about its longitudinal axis LA out of the plane of the edges E of the lips L. In a typical application, the channel C is bolted to a wall and extends generally vertically up the wall. Any object (e.g., object O) mounted on the channel C by the fastener 20 applies a load to the nut 22 which tends not only to cause it to slide down the channel, but also to tilt the nut generally about its longitudinal axis LA out of the plane including the channel edges E. The tilting of the nut 22 tends to drive the upper teeth (35A, 35B, as shown in FIG. 9) into the edges E and withdraw the lower teeth (35C, 35D) from the edges. The tendency of the load applied by the object to tilt the nut 22 out of the plane of the channel edges E is more readily understood when the object (e.g., a bracket) mounted by the fastener 20 which extends a substantial distance outwardly from the channel C. It is apparent in this situation that the load of the brace and equipment supported by the brace will include a substantial downwardly directed bending moment tending to cause the bolt B and the nut 22 to tilt as previously described.

In a test, the nut 22 having the teeth 35A-35D withstood substantially greater loads before slipping longitudinally in the channel than a nut 101 of identical construction except having teeth (such as tooth 102 shown in FIG. 8A) extending around the entire peripheries of their respective openings 94 rather than only along the laterally outer portions of the openings. The test was conducted by securing a steel plate to a channel using the fastener 20 and tightening the bolt B to a known torque. Loads directed longitudinally of the channel were then applied to the fastener 20 until it "failed". Failure was defined as slippage of the nut 22 one inch from its original position. The same test was performed with a fastener including the nut 101 with annular teeth 102. As may be seen in the table below, the slip-loads supported by the fastener 20 with semi-annular teeth 35A-35D were clearly superior to those supported by the fastener having the nut 101 with annular teeth 102.

| SLIP-LOAD TEST RESULTS | | | | | |
| --- | --- | --- | --- | --- | --- |
| (Nut with Teeth 35A-35D) | | | (Nut with Annular Teeth 102) | | |
| Test No. | Torque (ft/lbs) | Failure (lbs) | Test No. | Torque (ft/lbs) | Failure (lbs) |
| 1 | 25 | 2,748 | 1 | 25 | 2,105 |
| 2 | 25 | 2,584 | 2 | 25 | 2,249 |
| 3 | 25 | 2,831 | 3 | 25 | 1,931 |
| 4 | 25 | 2,877 | 4 | 20 | 1,782 |
| 5 | 25 | 2,784 | 5 | 20 | 1,937 |
| 6 | 20 | 2,865 | 6 | 25 | 2,141 |
| | | 2,782 avg. | | | 2,024 avg. |

At least two factors are believed to contribute to the superior performance of the teeth 35A-35D over the annular teeth 102. It is well known to enhance the gripping action of the teeth (i.e., teeth 35A-35D and teeth 102), by hardening them so that when the bolt B is tightened the teeth penetrate a short distance into the unhardened channel edges LE. The total force applied by the bolt B on each annular tooth 102 is spread out over the surface area of the tooth engaging the channel edge E, which surface area extends substantially around the entire circumference of the opening 94. However, for the semi-annular teeth 35A-35D, the total force applied by the bolt B on each tooth is spread out over roughly half the surface area of the annular tooth 102 because the laterally inner portion of the tooth 102 is not present in the semi-annular teeth 35A-35D. Thus, the load per unit surface area of the edge E engaged by an annular tooth 102 is substantially less than the load per unit area on an edge engaged by a semi-annular tooth (e.g., tooth 35A). Therefore, the penetration of the teeth 35A-35D into the channel edges E is further than the penetration of the teeth 102, which gives the teeth 35A-35D a better grip on the channel edge than the teeth 102 for resisting sliding lengthwise of the channel.

The teeth 35A-35D are constructed so that their tendency to be wedged out of engagement with the channel edges E is substantially reduced over that of the annular teeth 102. The superior performance of the semi-annular teeth 35A-35D in this regard may be understood by reference to FIGS. 14 and 15. A semi-annular tooth 35A is shown in FIG. 14 in engagement with a channel edge E after the bolt B is tightened with the tooth penetrating into the channel edge. Similarly, an annular tooth 102 is shown in FIG. 15 in engagement with the channel edge E after the bolt B is tightened with the tooth penetrating into the channel edge. In both figures, the direction of the load applied to the nut (22 or 101) and teeth (35A-35D or 102) is indicated by arrow 110. Referring to FIG. 15, a laterally inner portion of the annular tooth 102 has a "ramp" surface 112 on the laterally inner portion of the tooth which intersects the channel edge E at an acute angle. The ramp surface 112 acts as a wedge, converting the downwardly directed load 110 into a force including a horizontal component 114 directed inwardly away from the channel edge E which tends to pull the tooth 102 out of engagement with the channel edge E. Thus, the gripping action of the tooth 102 is reduced by the presence of the ramp surface 112. As shown in FIG. 14, the tooth 35A has no laterally inner portion or ramp surface 112. Therefore, the gripping action of the tooth 35A, produced by the engagement of a downwardly facing surface 116 of the tooth with the channel edge, is not reduced by any wedging action of the tooth.

The problem of the teeth wedging out of engagement with the channel edge E is exacerbated by the tendency of the nut (22 or 101) to tilt out of the plane of the channel edges. The tilting action (indicated by arrows 118) of the nut 101 increases the tendency of the ramp surface 112 of the tooth 102 to wedge the entire tooth out of engagement with the channel edge. However, the tilting action of nut 22 drives the tooth 35A more forcefully into engagement with the channel edge with a lesser tendency of the tooth to be wedged out of engagement with the channel edge. Moreover, the downwardly facing surface 116 of the tooth 35A is may be moved so that it intersects the channel edge E at a slightly obtuse angle so that the surface 116 acts as a wedge tending to pull the tooth into engagement with the channel edge under the load 110.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. For use with a channel having a bottom and a pair of side walls with inwardly directed lips formed thereon defining a slot therebetween extending the length of the channel, said lips terminating in edges extending lengthwise of the slot at opposite sides of the slot, a fastener for securing an object to the channel, said fastener comprising a nut having a first face constituting an outside face, an opposite face constituting an inside face, opposite ends, a width less than the width of the channel slot and a length greater than the width of the channel slot whereby the nut may be aligned with the slot, entered into the slot and passed inwardly through the slot from the outside to the inside of the channel and then turned about an axis of rotation to extend in a generally crosswise position relative to the slot for engagement of portions of the outside face of the nut at locations generally adjacent opposite ends of the nut with said channel edges, said nut further having a hole therethrough for receiving a fastener for fastening said object to the channel when the nut is in its said crosswise position, wherein the improvement comprises a retainer on the outside face of the nut for retaining the nut in its said crosswise position prior to and during fastening of said object to the channel, said retainer having a body with an opening therethrough generally coaxial with the hole through the nut to enable insertion of a fastener through the opening and into and through the hole in the nut, and flange means integrally formed as one piece with said body and extending laterally from the body for engagement with the channel lips at opposite sides of the channel slot when the nut is passed through the slot and turned to its said crosswise position, said flange means being substantially inflexible for preventing the retainer from being pushed inwardly completely through the slot when the nut is turned to its said crosswise position and when an object is being fastened to the channel, and resiliently deformable spring elements on the body of the retainer between said flange means and the outside face of the nut, said spring elements being integrally connected to the body at closely spaced intervals circumferentially of the body and being so sized and dimensioned as to be engageable with the channel lips when the nut is turned to its said crosswise position for exerting a spring force against the channel lips tending to hold the nut in its said crosswise position against slippage lengthwise of the channel slot, and means for holding the retainer in assembly with the nut.

2. A fastener as set forth in claim 1 wherein said spring elements are integrally connected to said flange means.

3. A fastener as set forth in claim 2 wherein said spring elements are so arranged and dimensioned that the spring force exerted by the spring elements on the channel lips has a first component generally perpendicular to a plane containing the edges of the channel lips at opposite sides of the channel slot, said first component of force tending to draw the nut outwardly with respect to the channel slot into clamping engagement with the edges of the channel lips, thereby inhibiting slippage of the nut lengthwise of the channel slot, and a second component generally parallel to said plane whereby the spring elements are adapted for anti-slip frictional engagement with the channel lips thereby to inhibit slippage of the nut lengthwise of the channel slot.

4. A fastener as set forth in claim 1 wherein said spring elements comprise a plurality of thin generally parallel fin-like members projecting laterally outward from the body.

5. A fastener as set forth in claim 4 wherein said fin-like members are located at closely spaced intervals around substantially the entire circumference of the body.

6. A fastener as set forth in claim 5 wherein said fin-like members are arranged so that when the nut is turned in one direction on said axis of rotation to its crosswise position, the spring force exerted by the fin-like members tends to hold the nut against rotation in the opposite direction out of its said crosswise position.

7. A fastener as set forth in claim 6 wherein adjacent fin-like members are spaced apart a first distance around the circumference of the body except at two locations diametrically opposite one another where adjacent fin-like members are spaced apart a second distance greater that the first distance.

8. A fastener as set forth in claim 5 wherein said body of the retainer is generally annular in shape, wherein each fin-like member is connected to the body of the retainer along a first edge extending generally axially with respect to the body, and wherein the fin-like member is connected to said flange means along a second edge extending generally radially with respect to the body, said fin-like member having at least one additional free edge engageable with said channel lips when the nut is turned to its said crosswise position, said free edge being adapted resiliently to deflect when said nut is inserted into the channel slot and turned to its said crosswise position to provide said spring force.

9. A fastener as set forth in claim 8 wherein each fin-line member is generally planar and generally in the shape of a rectangle, each fin-like member comprising a first portion on one side of a line extending diagonally with respect to the fin and generally bisecting the rectangle, said first portion remaining substantially undeformed when the nut is turned to its said crosswise position, and a second portion bounded at least in part by said free edge on the opposite side of said line, said second portion being adapted resiliently to deflect when the nut is turned to said crosswise position.

10. A fastener as set forth in claim 5 wherein the body of the retainer, said flange means and said spring elements are integrally molded as a single plastic part.

11. A fastener as set forth in claim 1 wherein said means for holding the retainer in assembly with the nut comprises a pair of pins on the body projecting through apertures in the nut, said pins being engageable with the nut to hold the retainer captive on the nut.

12. A fastener as set forth in claim 11 wherein said pins are dimensioned to extend inwardly from the body of the retainer through said apertures and inwardly beyond the inside face of the nut, each pin having an enlarged end engageable with the inside face of the nut to hold the retainer in assembly with the nut.

13. A fastener as set forth in claim 11 wherein said pins are adapted for snap-lock connection to the nut.

14. A fastener as set forth in claim 1 wherein said retainer has handle means thereon, said handle means being adapted to be gripped for facilitating entry of the nut into the channel slot, passage through the slot, and rotation of the nut to its said crosswise position.

15. A fastener as set forth in claim 14 wherein said handle means comprises a generally semi-annular handle attached only at its ends to said flange, the ends of the handle lying generally on a line which is oblique to the longitudinal axis of the nut to facilitate rotation of the nut to its said crosswise position.

16. A fastener as set forth in claim 15 wherein said line including the ends of the handle makes an angle with the longitudinal axis of the nut of approximately 35°.

17. A fastener as set forth in claim 14 wherein said handle means is integrally formed as one piece with said flange means.

18. A fastener as set forth in claim 17 wherein said retainer body, flange means, spring elements and handle means are integrally molded as a single plastic part.

19. A fastener as set forth in claim 14 wherein said flange means comprises an annular flange at the periphery of the retainer body, said handle means comprising a generally semi-circular handle attached only at its ends to said flange and being pivotable about its ends from an initial position generally in the plane of the annular flange to an operable position in which the handle arches over the flange to enable the handle to be gripped.

20. A fastener as set forth in claim 1 wherein the nut is made of sheet metal, the nut being punched through to form openings extending through the nut from the inside face to the outside face thereof and teeth integral with the nut projecting outwardly from the outside face of the nut at the peripheries of the openings for engagement with the channel edges when the nut is in said crosswise position thereby to inhibit slippage of the nut lengthwise of the channel in the slot when a load is applied to the nut tending to cause such slippage.

21. A fastener as set forth in claim 20 wherein the teeth are arranged in two pairs, each pair of teeth comprising two teeth adjacent a respective end of the nut on opposite sides of a central longitudinal axis of the nut extending lengthwise of the nut midway between opposite sides of the nut, each of the openings having a first peripheral portion, constituting a laterally outer portion, generally closer to a respective side of the nut than to said central longitudinal axis of the nut, and a second peripheral portion, constituting a laterally inner portion, generally closer to the central longitudinal axis of the nut than to a respective side of the nut, the two teeth of each pair of teeth extending only along said laterally outer portions of respective openings, the laterally inner portions of the openings being substantially free of any teeth.

22. For use with a channel having a bottom and a pair of side walls with inwardly directed lips formed thereon defining a slot therebetween extending the length of the channel, said lips terminating in edges extending lengthwise of the slot at opposite sides of the slot, a fastener for securing an object to the channel, said fastener comprising a nut having a first face constituting an outside face, an opposite face constituting an inside face, opposite ends, a width less than the width of the 10 channel slot and a length greater than the width of the channel slot whereby the nut may be aligned with the slot, entered into the slot and passed inwardly through the slot from the outside to the inside of the channel and then turned to extend in a generally crosswise position relative to the slot for engagement of portions of the outside face of the nut at locations generally adjacent opposite ends of the nut with said channel edges, said nut further having a hole therethrough for receiving a fastener for fastening said object to the channel when the nut is in its said crosswise position, wherein the improvement comprises a retainer on the outside face of the nut for retaining the nut in its said crosswise position prior to and during fastening of said object to the channel, said retainer having a body with an opening therethrough generally coaxial with the hole through the nut to enable insertion of a fastener through the opening and into and through the hole in the nut, and flange means integrally formed as one piece with said body and extending laterally from the body for engagement with the channel lips at opposite sides of the channel slot when the nut is passed through the slot and turned to its said crosswise position, and resiliently deformable spring means on the body engageable with the channel lips when the nut is turned to its said crosswise position for exerting a spring force against the channel lips tending to hold the nut in its said crosswise position against slippage lengthwise of the channel slot, means for holding the retainer in assembly with the nut, and handle means integrally formed as one piece with said flange means, said handle means being adapted to be gripped for facilitating entry of the nut into the channel slot, passage through the slot, and rotation of the nut to its said crosswise position.

23. A fastener as set forth in claim 22 wherein said retainer body, flange means and handle means are integrally molded as a single plastic part.

24. A fastener as set forth in claim 22 wherein said flange means comprises an annular flange at the periphery of the retainer body, said handle means comprising a bail member attached only at its ends to said flange and being pivotable about its ends from an initial position generally in the plane of the annular flange to an operable position in which the bail member arches over the flange to enable said handle means to be gripped.

25. A fastener as set forth in claim 24 wherein the ends of the bail member lie generally on a line which is oblique to the longitudinal axis of the nut to facilitate rotation of the nut to its said crosswise position.

26. A fastener as set forth in claim 25 wherein said line including the ends of the bail member makes an angle with the longitudinal axis of the nut of approximately 35°.

27. For use with a channel having a bottom and a pair of side walls with inwardly directed lips formed thereon defining a slot therebetween extending the length of the channel, said lips terminating in edges extending lengthwise of the slot at opposite sides of the slot, a fastener for securing an object to the channel, said fastener comprising a metal nut having a first face constituting an outside face, an opposite face constituting an inside face, opposite sides, opposite ends, a width less than the width of the channel slot and a length greater than the width of the channel slot whereby the nut may be aligned with the slot, entered into the slot and passed inwardly through the slot from the outside to the inside of the channel and then turned to extend in a generally crosswise position relative to the slot for engagement of portions of the outside face of the nut at locations generally adjacent opposite ends of the nut with said channel edges, said nut further having a hole therethrough for receiving a fastener for fastening said object to the channel when the nut is in its said crosswise position, a retainer on the outside face of the nut for retaining the nut in its said crosswise position prior to and during fastening of said object to the channel, wherein the improvement comprises anti-slip means on the outside face of the nut engageable with said channel edges when the nut is in its crosswise position for inhibiting slippage of the nut lengthwise of the channel in the slot when a load is applied to the nut tending to cause such slippage, said anti-slip means comprising two pairs of openings in the nut extending through the nut from the inside face of the nut to the outside face of the nut, and teeth integral with the nut projecting outwardly from the outside face of the nut at the peripheries of the openings for engagement with the channel edges when the nut is in said crosswise position, each pair of teeth comprising two teeth adjacent a respective end of the nut on opposite sides of a central longitudinal axis of the nut extending lengthwise of the nut midway between opposite sides of the nut, each opening having a first peripheral portion, constituting a laterally outer portion, generally closer to a respective side of the nut than to said central longitudinal axis of the nut, and a second peripheral portion, constituting a laterally inner portion, generally closer to the central longitudinal axis of the nut than to a respective side of the nut, the two teeth of each pair of teeth extending only along said laterally outer portions of respective openings, the laterally inner portions of the openings being substantially free of any teeth.

28. For use with a channel having a bottom and a pair of side walls with inwardly directed lips formed thereon defining a slot therebetween extending the length of the channel, said lips terminating in edges extending lengthwise of the slot at opposite sides of the slot, a fastener for securing an object to the channel, said fastener comprising a nut having a first face constituting an outside face, an opposite face constituting an inside face, opposite ends, a width less than the width of the channel slot and a length greater than the width of the channel slot and a length greater than the width of the channel slot whereby the nut may be aligned with the slot, entered into the slot and passed inwardly through the slot from the outside to the inside of the channel and then turned about an axis of rotation to extend in a generally crosswise position relative to the slot for engagement of portions of the outside face of the nut at locations generally adjacent opposite ends of the nut with said channel edges, said nut further having a hole therethrough for receiving a fastener for fastening said object to the channel when the nut is in its said crosswise position, wherein the improvement comprises handle means affixed to the fastener, said handle means being pivotable with respect to the fastener between a position in which said handle means does not project substantially above a plane parallel to the plane of the outer face of the nut and an operable position in which said handle means extends outwardly with respect to the fastener for grasping to facilitate entry of the nut into the channel slot, passage through the slot, and rotation of the nut to its said crosswise position.

29. For use with a channel having a bottom and a pair of side walls with inwardly directed lips formed thereon defining a slot therebetween extending the length of the channel, said lips terminating in edges extending lengthwise of the slot at opposite sides of the slot, a fastener for securing an object to the channel, said fastener comprising a nut having a first face constituting an outside face, an opposite face constituting an inside face, opposite ends, a width less than the width of the channel slot and a length greater than the width of the channel slot whereby the nut may be aligned with the slot, entered into the slot and passed inwardly through the slot from the outside of the channel and then turned about an axis of rotation to extend in a generally crosswise position relative to the slot for engagement of portions of the outside face of the nut at locations generally adjacent opposite ends of the nut with said channel edges, said nut further having a hole therethrough for receiving a fastener for fastening said object to the channel when the nut is in its said crosswise position, wherein the improvement comprises handle means affixed to the fastener, said handle means being adapted to be gripped for facilitating entry of the nut into the channel slot, passage through the slot, and rotation of the nut to tis said crosswise position, said handle means comprising a generally semi-annular handle attached only at its ends to the fastener, the ends of the handle lying generally on a line which is oblique to the longitudinal axis of the nut to facilitate rotation of the nut to its said crosswise position.

30. A fastener as set forth in claim 29 wherein said line including the ends of the handle makes an angle with the longitudinal axis of the nut of approximately 35°.

31. For use with a channel having a bottom and a pair of side walls with inwardly directed lips formed thereon defining a slot therebetween extending the length of the channel, said lips terminating in edges extending lengthwise of the slot at opposite sides of the slot, a fastener for securing an object to the channel, said fastener comprising a nut having a first face constituting an outside face, an opposite face constituting an inside face, opposite ends, a width less than the width of the channel slot and a length greater than the width of the channel slot whereby the nut may be aligned with the slot, entered into the slot and passed inwardly through the slot from the outside to the inside of the channel and then turned about an axis of rotation to extend in a generally crosswise position relative to the slot for engagement of portions of the outside face of the nut at locations generally adjacent opposite ends of the nut with said channel edges, said nut further having a hole therethrough for receiving a fastener for fastening said object to the channel when the nut is in its said crosswise position, wherein the improvement comprises a retainer on the nut for retaining the nut in its said crosswise position prior to and during fastening of said object to the channel, the retainer having substantially inflexible flange means engageable with the channel lips to prevent the retainer from being pushed through the channel slot when the nut is entered into the channel and turned to said crosswise position and during fastening of said object to the channel, handle means affixed to the fastener, said handle means being adapted to be grasped for facilitating entry of the nut into the channel slot, passage through the slot, and rotation of the nut to its said crosswise position.

32. For use with a channel having a bottom and a pair of side walls with inwardly directed lips formed thereon defining a slot therebetween extending the length of the channel, said lips terminating in edges extending lengthwise of the slot at opposite sides of the slot, a fastener for securing an object to the channel, said fastener comprising a nut having a first face constituting an outside face, an opposite face constituting an inside face, opposite ends, a width less than the width of the channel slot and a length greater than the width of the channel slot whereby the nut may be aligned with the slot, entered into the slot and passed inwardly through the slot from the outside to the inside of the channel and then turned about an axis of rotation to extend in a generally crosswise position relative to the slot for engagement of portions of the outside face of the nut at locations generally adjacent opposite ends of the nut with said channel edges, said nut further having a hole therethrough for receiving a fastener for fastening said object to the channel when the nut is in its said crosswise position, wherein the improvement comprises a handle affixed at its ends to the fastener and adapted to define a passage between the fastener and the handle for receiving a finger therethrough such that the handle may be grasped for facilitating entry of the nut into the channel slot, passage through the slot, and rotation of the nut to its said crosswise position.

33. A fastener as set forth in claim 32 further comprising a retainer on the nut for retaining the nut in its said crosswise position prior to and during fastening of said object to the channel, the handle being formed as one piece with the retainer.

* * * * *

UNITED STATES PATENT AND TRADEMARK OFFICE
CERTIFICATE OF CORRECTION

PATENT NO. : 5,209,619

DATED : May 11, 1993

INVENTOR(S) : Eric R. Rinderer

It is certified that error appears in the above-identified patent and that said Letters Patent is hereby corrected as shown below:

Column 9, line 34, "edges LE" should read ---edges E---.

Column 15, claim 29, line 46, "outside of the channel" should read ---outside to the inside of the channel---.

Column 15, claim 29, line 58, "to tis" should read ---to its---.

Signed and Sealed this

Twenty-fifth Day of January, 1994

Attest:

BRUCE LEHMAN

*Attesting Officer*     *Commissioner of Patents and Trademarks*